United States Patent
Lenz et al.

(10) Patent No.: US 6,847,312 B2
(45) Date of Patent: Jan. 25, 2005

(54) SYMMETRIC LINE CODING

(75) Inventors: Gadi Lenz, Fanwood, NJ (US); Jason Stark, Holmdel, NJ (US)

(73) Assignee: Kodeos Communications, South Plainfield, NJ (US)

(*) Notice: Subject to any disclaimer, the term of this patent is extended or adjusted under 35 U.S.C. 154(b) by 205 days.

(21) Appl. No.: 10/100,361

(22) Filed: Mar. 18, 2002

(65) Prior Publication Data

US 2002/0175837 A1 Nov. 28, 2002

Related U.S. Application Data

(60) Provisional application No. 60/277,026, filed on Mar. 19, 2001.

(51) Int. Cl.[7] ............................................. H03M 7/00
(52) U.S. Cl. ........................ 341/50; 341/58; 341/68
(58) Field of Search ............................ 341/50, 58, 59, 341/68–74

(56) References Cited

U.S. PATENT DOCUMENTS

| | | | | |
|---|---|---|---|---|
| 3,678,503 A | * | 7/1972 | Sollman | 341/72 |
| 3,815,122 A | * | 6/1974 | Schwartz et al. | 341/74 |
| 4,677,319 A | | 6/1987 | Goodchild | 307/475 |
| 5,177,482 A | * | 1/1993 | Cideciyan et al. | 341/59 |
| 5,331,320 A | * | 7/1994 | Cideciyan et al. | 341/56 |
| 5,454,006 A | * | 9/1995 | Krook | 375/259 |

FOREIGN PATENT DOCUMENTS

| | | | | |
|---|---|---|---|---|
| EP | 0 471 130 | 2/1992 | | H03M/7/14 |
| EP | 0 543 070 | 5/1993 | | H03M/5/20 |

* cited by examiner

*Primary Examiner*—Michael Tokar
*Assistant Examiner*—Khai M. Nguyen
(74) *Attorney, Agent, or Firm*—Mayer Fortkort & Williams, PC; Mark K. Young, Esq.; Stuart H. Mayer, Esq.

(57) ABSTRACT

A method an apparatus for symmetric line coding is provided where a binary input signal d is received; a value for each of a pair of binary bits p and q are dynamically defined in response to the input stream; and a pair of output bitstreams $v_1$ and $v_2$ are dynamically generated in accordance with the following: if d=1, then $v_1$=p and $v_2$=p, and if d=0, then $v_1$=(1−q) and $v_2$=q.

In illustrative embodiments of the invention, the generation may be performed by symmetric-line coding machines, including: a bitstream symmetric line coding machine, a regular bitstream symmetric line coding machine, a complementary regular bitstream symmetric line coding machine, a binary complementary regular symmetric line coding machine, a bitstream parallel symmetric line coding machine, a regular bitstream parallel symmetric line coding machine, a complementary regular bitstream parallel symmetric line coding machine, and a binary complementary regular parallel symmetric line coding machine.

18 Claims, 10 Drawing Sheets data latch selector $$p(k) = p(k-1) + \overline{d(k)}$$

$$q(k) = q(k-1) + d(k)$$

$$v_1(k) = \overline{d(k)} \cdot \overline{q(k)} + d(k) \cdot p(k)$$

$$v_2(k) = \overline{d(k)} \cdot q(k) + d(k) \cdot p(k)$$

$$\overline{d} = 1 - d$$

All addition modulo 2

FIG 1

$$p(k) = p(k-1) + \overline{d(k)}$$

$$q(k) = q(k-1) + d(k)$$

$$v_1(k) = \overline{d(k)} \cdot \overline{q(k)} + d(k) \cdot p(k)$$

$$v_2(k) = \overline{d(k)} \cdot q(k) + d(k) \cdot p(k)$$

$$\overline{d} = 1 - d$$

All addition modulo 2

$n \cdot \left( \left\lceil \dfrac{n-1}{3} \right\rceil + 4 \right)$ functional elements $\left\lceil \dfrac{n-1}{3} \right\rceil + 2$ stages $n = 8$ depicted $D_{k,j}^{(n)} = d(k \cdot n + j)$ $P_{k,j}^{(n)} = p(k \cdot n + j) = P_{k-1,j}^{(n)} + \delta P_{k,j}^{(n)}$ $Q_{k,j}^{(n)} = q(k \cdot n + j) = Q_{k-1,j}^{(n)} + \delta Q_{k,j}^{(n)}$ All sums modulo 2

$\delta Q_{k,j}^{(n)} = \sum\limits_{m=j+1}^{j+n} D_{k-1,m}^{(n)} = \sum\limits_{m=j+1}^{j+n} D_{k-1,m}^{(n)}$ $\delta P_{k,j}^{(n)} = \sum\limits_{m=j+1}^{j+n} \overline{D}_{k-1,m}^{(n)} = \sum\limits_{m=j+1}^{j+n} (1 - D_{k-1,m}^{(n)}) = \sum\limits_{m=j+1}^{j+n} (1 + D_{k-1,m}^{(n)}) = n + \sum\limits_{m=j+1}^{j+n} D_{k-1,m}^{(n)}$ $v_1 = (\overline{d} \wedge \overline{q}) \vee (d \wedge p), \quad \varphi_1 = v_1 \cdot \pi$ $v_2 = (\overline{d} \wedge q) \vee (d \wedge p), \quad \varphi_2 = -v_2 \cdot \pi$ $z = 1 + d + p + q$

SYMMETRIC LINE CODING

STATEMENT OF RELATED APPLICATION

This application claims the benefit of priority to U.S. Provisional Patent Application No. 60/277,026, filed Mar. 19, 2001, entitled "SYMMETRIC LINE CODING".

BACKGROUND OF THE INVENTION

High bandwidth optical communications systems typically use continuous wave ("CW") lasers, passing through an intensity modulator, to encode and transmit data. The light emitted by the laser has a very narrow frequency spread, characteristic of a coherent light source. The modulator is driven by high bandwidth electrical signals. These signals spread the frequency spectrum of the light to roughly twice the bandwidth of the modulating electrical signals. However, generating these high bandwidth electrical signals is expensive using conventional arrangements, and the resulting spread of the optical spectrum limits the spacing of separate frequency channels in a wavelength division multiplexed system.

SUMMARY OF THE INVENTION

The aforementioned problems are addressed by an arrangement for symmetric line coding in accordance with the invention. A method an apparatus for symmetric line coding is provided where a binary input signal d is received; a value for each of a pair of binary bits p and q are dynamically defined in response to the input stream; and a pair of output bitstreams $v_1$ and $v_2$ are dynamically generated in accordance with the following: if d=1, then $v_1$=p and $v_2$=p, and if d=0, then $v_1$=(1−q) and $v_2$=q.

In illustrative embodiments of the invention, the generation may be performed by symmetric-line coding machines, including: a bitstream symmetric line coding machine, a regular bitstream symmetric line coding machine, a complementary regular bitstream symmetric line coding machine, a binary complementary regular symmetric line coding machine, a bitstream parallel symmetric line coding machine, a regular bitstream parallel symmetric line coding machine, a complementary regular bitstream parallel symmetric line coding machine, and a binary complementary regular parallel symmetric line coding machine.

In other illustrative embodiments, the inventive arrangment is couple to a modulator, for example a Mach-Zender modulator.

Advantageously, the arrangement of the present invention reduces the bandwidth requirements of the electrical signals, so that these signals are more easily produced, and further reduces the spread of the optical spectrum, so that channels may be spaced more closely.

DETAILED DESCRIPTION

Most systems use a signaling format known as On-Off Keying ("OOK"). In OOK, the light from a laser is modulated such that a low amplitude signal represents one logical state (a "0" state, for instance), while a high amplitude signal represents another logical state (a "1" state). These two logical states, representing the data bit values 0 and 1, are propagated along the transmission line repetitively once each clock period (sampling instant), T. Equipment at the receiving terminal detects the intensity of the light signal, reconstructs the clock, samples the light intensity at each clock interval, and decides whether a 0 or 1 data bit was transmitted.

The electric field of the light modulated onto the optical fiber may be described according to its radio-frequency ("RF") electric field envelope and the underlying optical carrier field. The envelope contains the RF field amplitude, together with the complex phase of the field. An OOK signal has an envelope that takes on values of 0 or 1 at each sampling instant. More complex line codes take on other values at each sampling instant. For instance, phase shift keying takes on values in the set $\{-1, +1\}$, while Alternate Mark Inversion ("AMI") takes on values in $\{-1, 0, +1\}$.

The envelope may be represented as a data symbol multiplied into a unit modulation pulse. In this way, a Non-Return-to-Zero ("NRZ") OOK signal may be represented as a full duty cycle modulation pulse, multiplied by a data amplitude in the set $\{0,1\}$. This may be expressed as the convolution of the unit modulation pulse with a train of impulses, each carrying a weight given by the data amplitude.

The power spectrum of the light on the transmission fiber is determined from the RF envelope. When the envelope is represented as the convolution of modulation pulse and data amplitude impulse train, the power spectrum is simply the product of the Fourier transform of the modulation pulse and that of the impulse train. The transform of the impulse train is expressed in terms of its autocorrelation. For this reason, correlations in the data amplitudes introduce structure into the transmission power spectrum. It is control of these correlations, and the associated shaping of the power spectrum, that is the goal of line coding.

The optical power spectrum of the transmission may be calculated from the autocorrelation of the line code. The electric field envelope, E(t), is made up of unit modulation pulses, emitted at each clock period, T, weighted by the output symbols, $b_k$. This may be written as a convolution of an impulse train, weighted by the output amplitudes, with the unit modulation pulse, $$E(t)=\Sigma b_k \cdot p(t-kT)=\Sigma b_k \cdot \delta(t-kT) \otimes p(t).$$

The power spectral density is the product of the line code spectral density and that of the unit modulation pulse, $$S(\omega)=S_L(\omega) \cdot |P(\omega)|^2.$$

The line code power spectral density is, explicitly, $$S_L(\omega) = \frac{1}{T} \sum_{n=-\infty}^{\infty} R_n e^{in\omega T_0}, \text{ for } R_n = \langle b_k b^*_{k+n} \rangle, \quad (1)$$

where the autocorrelation coefficient, $R_n$, is calculated over the statistical expectation of output symbol products. The unit modulation pulse spectral density is $$P(\omega) = \int_{-\infty}^{\infty} p(t)e^{-i\omega t}.$$

The line code power spectral density, $S_L(\omega)$, provides a means to control the spectrum of the transmission by controlling the correlations between output symbols. These relations demonstrate that spectral shaping may be effected without changing the modulation pulse itself. The intellectual property contained in this document will comprise invention of spectral shaping line codes, and their implementations, to control the spectrum of transmission of optical signals, and the mitigation of impairments suffered in propagating through optical fiber.

The line code power spectral density may be computed for OOK, $$S_{OOK}(\omega) = \frac{1}{4T} + \frac{2\pi}{4T^2}\sum_{n=-\infty}^{\infty}\delta\left(\omega - \frac{2\pi n}{T}\right), \quad (2)$$

where the first term on the right hand side represents a flat frequency-independent spectrum, and the second term, narrow peaks at multiples of the clock frequency. The flat spectrum uses requires bandwidth out to very high frequencies, causing channels to be broadly spaced. The narrow spectral peaks, which result from the phase coherence of the light source, are problematic due to nonlinear propagation effects in optical fibers. Both of these issues are addressed by line coding.

The power spectral density for the ASI line code is $$S_{ASI}(\omega) = \frac{1}{4T}(1 + \cos\omega T) = \frac{1}{2T}\cos^2\omega\frac{T}{2}, \quad (3)$$

from which it is evident that the spectrum has been shaped to have a null at the Nyquist frequency, $\omega_{Nyquist}=\pi/T$. This narrows the spectral bandwidth, and allows closer channel spacing. It also reduces the impact of dispersive propagation impairments.

Each bit of the output symbol may be mapped onto the contacts of a Mach-Zehnder ("MZ") modulator. The MZ modulator divides the incoming light into two waveguides, applies a variable and independent phase shift, $\phi_1$ and $\phi_2$, to each, and recombines them at the output The effect is to generate an optical field at the output with electric field envelope proportional to $E\sim[\exp(i\pi\cdot\phi_1)+\exp(i\pi\cdot\phi_2)]/2$.

The phase shifts may be configured such that, for two input bits, $v_1$ and $v_2$, the phase shits satisfy $\phi_1=(v_1+v_2)/2$ and $\phi_2=-(v_1+v_2)/2$, so that $$E \sim \cos\left(\pi \cdot \frac{v_1 + v_2}{2}\right),$$

so that the sum of the two input bits determines the output state. When $(v_1, v_2)=(0,0)$, then $E\sim 1$; when $(v_1, v_2)=(0,1)$ or $(v_1, v_2)=(1,0)$ then $E\sim 0$; and when $(v_1, v_2)=(1,1)$, then $E\sim -1$. Alternatively, the phase shifts may be configured such that $\phi_1=(v_1-v_2)/2$ and $\phi_2=-(v_1-v_2)/2$, and the difference of the output bits determine the modulator output. Other alternatives include complementing either or both of the output bits, $v_1$ and $v_2$.

The ability to drive a modulator with the sum or difference of two output bits enables the following beneficial aspect: transitions in the output of the modulator may be effected by transitions of either of the two inputs, independently. This provides a means to reduce the frequency with which the two binary inputs make transitions. This translates directly into reduced requirements for the electronic and optical components. In order to take advantage of this opportunity, some method of signal processing is required to produce the correct signals, $v_1$ and $V_2$, to be used to drive the modulator contacts. This method is line coding, a broad category of which will be described by symmetric line coding machines.

The symmetric line coding machine of the present invention may be described in the following way. The unique input symbols form a set, $\{d_1, \ldots, d_n\}$. For each input symbol, there is associated a pair of output symbols, forming a set, $\{\{P_1,Q_1\}, \ldots, \{P_n,Q_n\}\}$. Each time the machine receives an input symbol, $d_k$, it produces an output symbol from the appropriate set, $\{P_k,Q_k\}$. The symbols $P_k$ and $Q_k$ may, or may not, be unique. For at least one k, $P_k$ and $Q_k$ must differ.

For each k, the first time that input $d_k$ is received, output $P_k$ is produced. Subsequently, for each k, whenever input $d_k$ is received, either $P_k$ or $Q_k$ is output, according to the following rule. Upon receiving input $d_k$, determine the most recent prior occurrence of the same input $d_k$, and which output symbol, from the set $\{P_k,Q_k\}$, was produced for that input. If the number of intervening input symbols, between the current input $d_k$ and the most recent prior occurrence of $d_k$, is an odd number, then produce whichever output symbol, from the set $\{P_k,Q_k\}$, was not emitted in the most recent prior instance of input $d_k$. Otherwise, produce the same output symbol, from the set $\{P_k,Q_k\}$, that was emitted in the most recent prior instance of input $d_k$.

An example of such a machine follows. Let the input symbol set be $\{d_1, d_2, d_3\}$, and the output set be $\{\{P_1,Q_1\}, \{P_2,Q_2\}, \{P_3,Q_3\}\}$. Suppose the input symbol sequence is $d_1$ $d_2$ $d_3$ $d_1$ $d_3$ $d_3$. Then the output sequence would be $P_1$ $P_2$ $P_3$ $P_1$ $Q_3$ $Q_3$. The first output is $P_1$, since it is the first instance of input $d_1$. The second output is $P_2$, since it is the first instance of input $d_2$. The third output is $P_3$, since it is the first instance of input $d_3$. The fourth input is $d_1$, so count the number of input symbols between this instance of $d_1$ and the most recent prior instance of $d_1$, at which time output $P_1$ was produced. There are two such inputs, $d_3$ and $d_2$, so the same output symbol, $P_1$, is produced as was produced most recently when input $d_1$ was received. The fifth input is $d_3$, for which there is one other symbol, $d_1$, intervening between this input and the most recent prior input of $d_3$, for which the output symbol was $P_3$. One is an odd number, so the output symbol is not $P_3$, but instead is $Q_3$. The sixth input is $d_3$, corresponding to output symbol $Q_3$. The immediately prior input was $d_3$, also, so there are zero other symbols intervening. Zero is not an odd number, so the output symbol is the same as for that input, $Q_3$.

Several specific symmetric line coding machine machines are now described.

The Bitstream symmetric line coding machines is a symmetric line coding machines in which each input symbol, $d_k$, is a sequence of binary digits (bits). Likewise, each output is a sequence of bits.

The Regular Bitstream symmetric line coding machine is a symmetric line coding machine in which each input symbol, $d_k$, is a sequence of n bits, and each output symbol is a unique sequence of n+1 bits.

The Complementary Regular Bitstream symmetric line coding machine is a symmetric line coding machine in which each input symbol, $d_k$, is a sequence of n bits, each output symbol is a unique sequence of n+1 bits, and for each input symbols, $d_k$, the two corresponding output symbols, $P_k$ and $Q_k$, are bitwise complements of each other.

The Binary Complementary Regular Bitstream symmetric line coding machine is a Complementary Regular Bitstream symmetric line coding machine with n=1.

Figure 1:
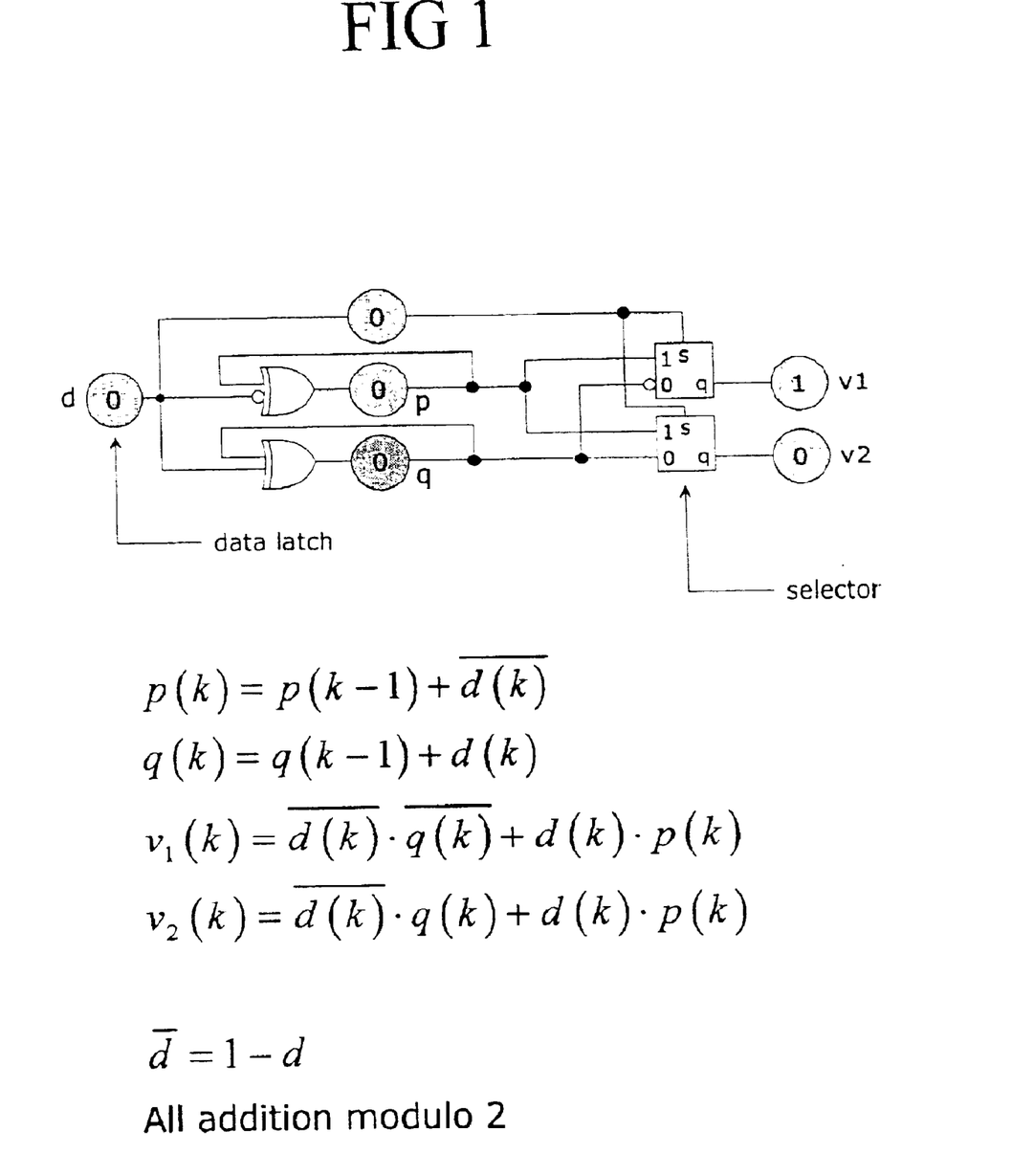
FIG. 1 depicts a simplified block diagram of an illustrative embodiment of a Binary Complementary Regular Bitstream symmetric line coding machine in accordance with the invention.

An illustrative embodiment of the Binary Complementary Regular Bitstream symmetric line coding machine is depicted in FIG. 1. The binary input, d, is processed to produce binary output pairs, $(v_1, v_2)$.

Figure 2:
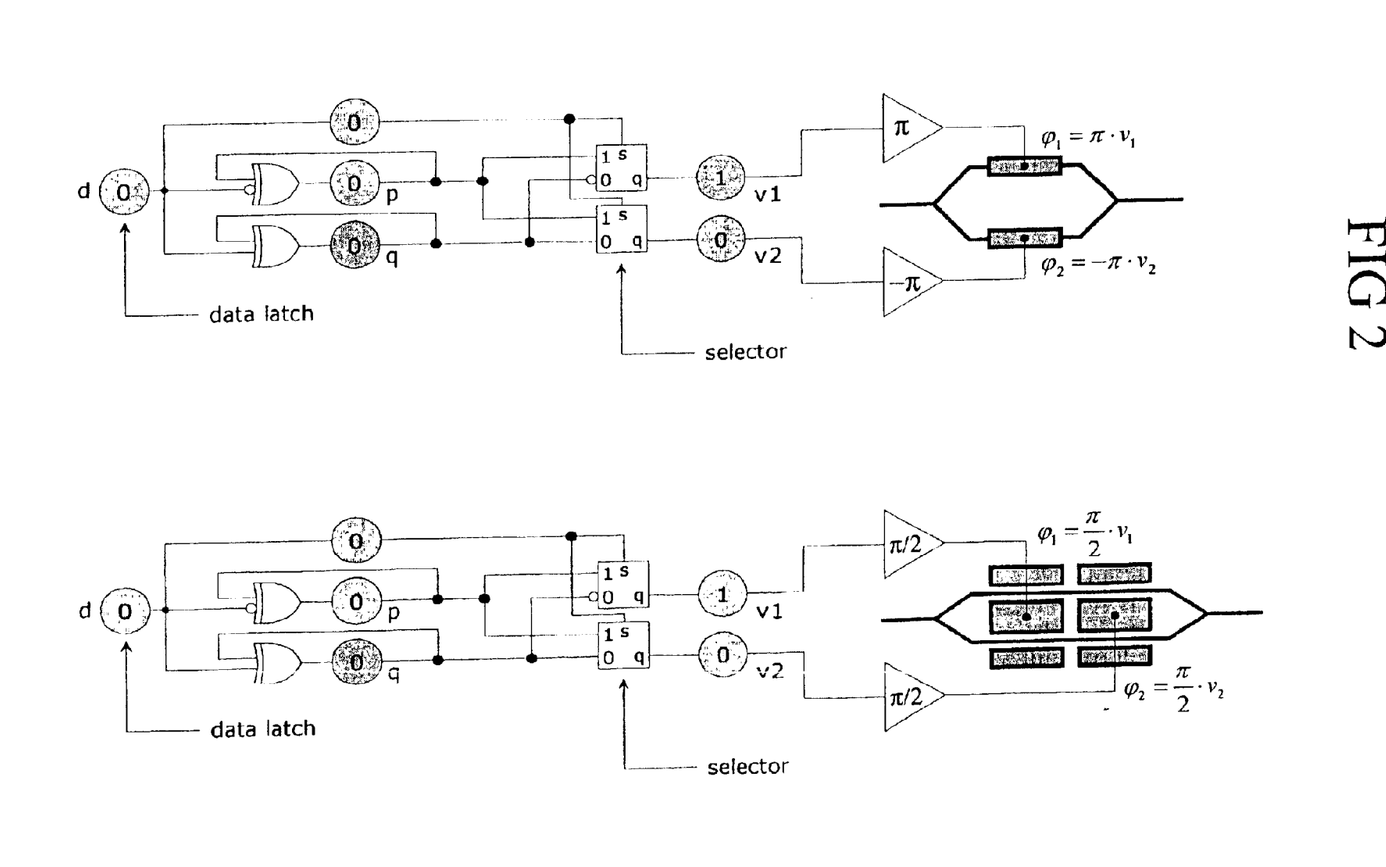
FIG. 2 depicts simplified block diagrams of driver circuits that are operationally coupled with modulators in accordance with the invention.

The symmetric line coding modulator, in accordance with the invention, is the application of each of the output bits of a Binary Complementary Regular Bitstream symmetric line coding machine to the two contacts of a MZ modulator, as depicted in FIG. 2. The two output bits are amplified by drive amplifiers, and the resulting signal applied to the contacts of the modulator. The power spectrum of the electrical signal applied to each contact of the modulator is described by Eq (3). For the symmetric line coding machines Modulator, the electric field envelope of the optical transmission is described by the ASI line code. The optical spectrum is also described by Eq. (3), so that a null is driven into the power spectrum of the transmitted light. This significantly lowers the high frequency content of the transmission, producing narrower channels, and allowing channels to be more closely spaced.

Parallel symmetric line coding machines are now described.

It may be desirable to have the input symbols presented to the symmetric line coding machine on a set of N parallel input lines, and the symmetric line coding machine output applied onto a set of M parallel output lines. At the input, a rule is established for identifying the sequence order of the inputs on each of the parallel input lines; at the output, a rule is established for identifying the sequence order of the outputs on each of the parallel output lines. Given these two rules, the contents of the input lines are processed to produce the contents of the output lines according to the operation of a symmetric line coding machine.

Several specific parallel-symmetric line coding machine are now described.

The Bitstream parallel-symmetric line coding machine is a parallel-symmetric line coding machine in which each input symbol, $d_k$, is a sequence of binary digits (bits). Likewise, each output is a sequence of bits.

The Regular Bitstream parallel-symmetric line coding machine is a parallel-symmetric line coding machine in which each input symbol, $d_k$, is a sequence of n bits, and each output symbol is a unique sequence of n+1 bits.

The Complementary Regular Bitstream parallel-symmetric line coding machine is a parallel-symmetric line coding machine in which each input symbol, $d_k$, is a sequence of n bits, each output symbol is a unique sequence of n+1 bits, and for each input symbols, $d_k$, the two corresponding output symbols, $P_k$ and $Q_k$, are bitwise complements of each other.

The Binary Complementary Regular Bitstream parallel-symmetric line coding machine is a Complementary Regular Bitstream parallel-symmetric line coding machine with n=1.

An illustrative embodiment of Binary Complementary Regular Bitstream parallel-symmetric line coding machine is now described.

Figure 3:
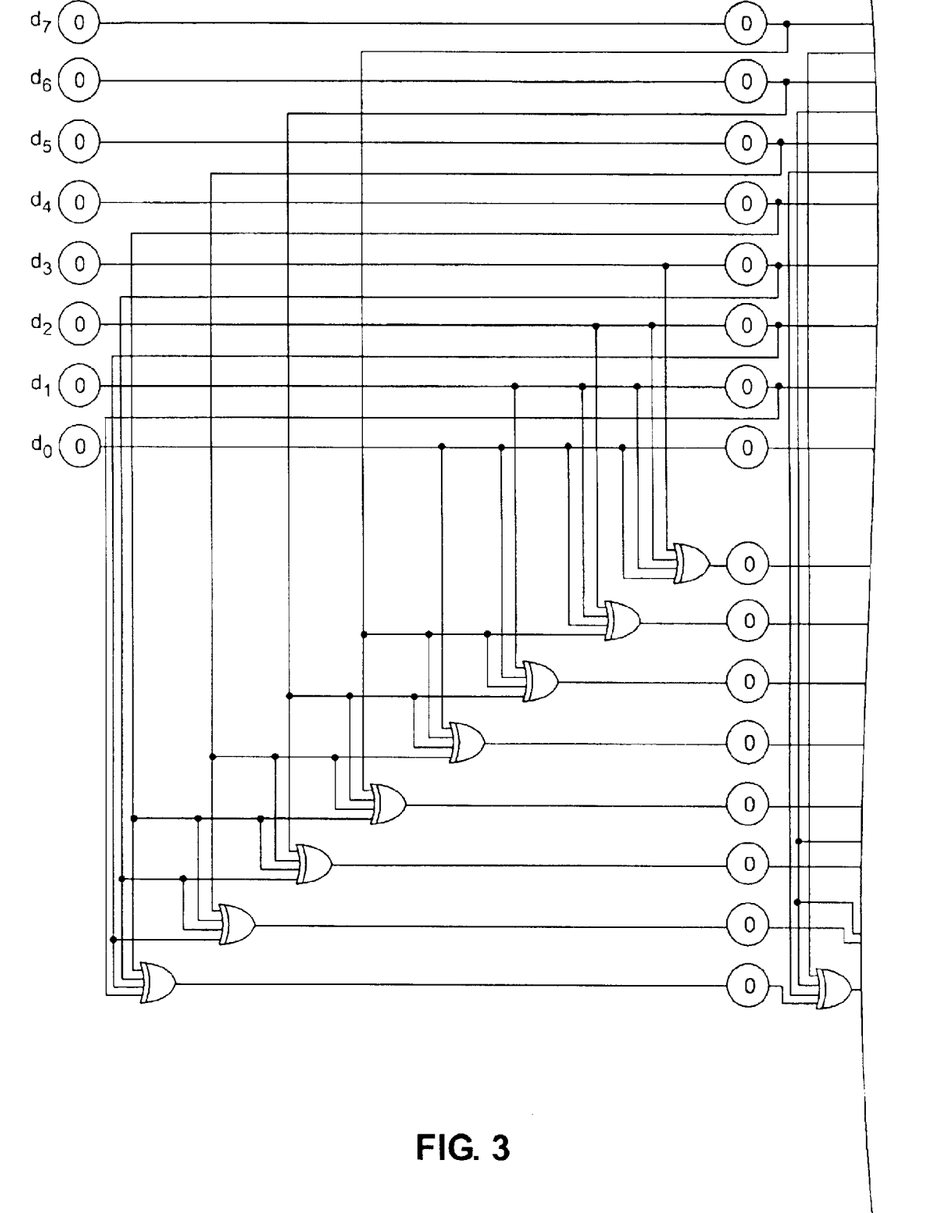
FIG. 3 depicts an illustrative block diagram of an 8 bit-parallel bus symmetric line coding machine in accordance with the invention.

An embodiment of a parallel symmetric line coding machine, shown in FIG. 3, teaches how to construct logic for an 8-bit parallel bus. The inputs, labeled $d_0$ through $d_7$, are processed to produce the outputs, labeled $v1_0$ through $v1_7$ and $v2_0$ through $v2_7$. The output symbol pairs are (v1,v2). The ordering is first $d_0$, next $d_1$, ..., finally ($d_7$, and likewise on the output.

Other embodiments of the invention may be implemented in accordance with the claims that follow.

What is claimed is:

1. A method comprising the steps of:

receiving a binary input stream d;

dynamically defining the value for each of a pair of binary bits p and q in response to the binary input stream d; and dynamically generating an output pair of bitstreams, v1 and v2, where the generating is performed in accordance with the following (a) for a binary input d of a value, then both v1 and v2 are supplied with same value of either binary bit p or binary bit q, and (b) for a complement to the value of binary input d, then supply to the output pair, a value of an other binary bit p or q that was not supplied in step (a) and a complement to the other binary bit p or q.

2. A method comprising the steps of:

receiving a binary input stream d;

dynamically defining a value for each of a pair of binary bits p and q in response to the binary input stream d; and dynamically generating the output pair of bitstreams as an output, v1 and v2, where the generating is performed in accordance with the following (a) if d=1, then v1=p and v2=qp, and (b) if d=0, then v1=(1−q) and v2=q.

3. A symmetric line coding apparatus, comprising:

an input port for receiving a binary input signal d;

a circuit coupled to the input port to dynamically define a value for each of a pair of binary bits p and q in response to the binary input stream d;

a pair of output ports coupled to the circuit, whereby the circuit dynamically generates an pair of bitstreams, v1 and v2, for output at the pair of outputs ports and the generating is performed in accordance with the following (a) for a binary input d of a value, then both v1 and v2 are supplied with same value of either binary bit p or binary bit q, and (b) for a complement to the value of binary input d, then supply to the output pair, a value of an other binary bit p or q that was not supplied in step (a) and a complement to the other binary bit p or q.

4. The apparatus of claim 3 further including a dual input modulator coupled to the respective output ports.

5. The apparatus of claim 4 whereby the modulator is a Mach-Zender modulator.

6. A symmetric line coding apparatus, comprising:

an input port for receiving a binary input signal d;

a circuit coupled to the input port to dynamically define a value for each of a pair of binary bits p and q in response to the binary input stream d;

a pair of output ports coupled to the circuit, whereby the circuit dynamically generates an pair of bitstreams, v1 and v2, for output at the pair of outputs ports and the generating is performed in accordance with the following (a) if d=1, then v1=p and v2=qp, and (b) if d=0, then v1=(1−q) and v2=q.

7. The apparatus according to claim 6 further including a data latch coupled to the input port to latch the state of the input bit stream at each clock cycle.

8. The apparatus of claim 6 further including a switch coupled to each output port for selecting the value of an output bitstream supplied at each the output ports.

9. A symmetric line coding apparatus, comprising:
an input port for receiving a binary input signal d;
a circuit coupled to the input port to dynamically define a value for each of a pair of binary bits p and q in response to the binary input stream d;
a pair of output ports coupled to the circuit, whereby the circuit dynamically generates an pair of bitstreams, v1 and v2, for output at the pair of outputs ports and the generating is performed using a symmetric line coding machine.

10. The apparatus of claim 9 where the symmetric line coding machine is a regular bitstream symmetric line coding machine.

11. The apparatus of claim 9 where the symmetric line coding machine is a complementary regular bitstream symmetric line coding machine.

12. The apparatus of claim 9 where the symmetric line coding machine is a binary complementary regular bitstream symmetric line coding machine.

13. The apparatus of claim 9 where the symmetric line coding machine includes a set of N parallel input lines and M parallel output lines.

14. The apparatus of claim 13 where the symmetric line coding machine includes a set of N parallel input lines and M parallel output lines is bitstream parallel-symmetric line coding machine.

15. The apparatus of claim 13 where the symmetric line coding machine includes a set of N parallel input lines and M parallel output lines is regular bitstream parallel-symmetric line coding machine.

16. The apparatus of claim 13 where the symmetric line coding machine machine includes a set of N parallel input lines and M parallel output lines is a complementary bitstream parallel-symmetric line coding machine.

17. The apparatus of claim 13 where the symmetric line coding machine machine includes a set of N parallel input lines and M parallel output lines is a binary complementary regular bitstream parallel-symmetric line coding machine.

18. The apparatus of claim 13 where the symmetric line coding machine machine includes a set of N parallel input lines and M parallel output lines and N=8 and M=8.

* * * * *

UNITED STATES PATENT AND TRADEMARK OFFICE
CERTIFICATE OF CORRECTION

PATENT NO. : 6,847,312 B2
DATED : January 25, 2005
INVENTOR(S) : Gadi Lenz et al.

It is certified that error appears in the above-identified patent and that said Letters Patent is hereby corrected as shown below:

Column 1,
Line 26, after "method", change "an" to -- and --.

Column 2,
Line 45, after "is", change "couple" to -- coupled --.

Column 3,
Line 46, between "output" and "The", insert -- . --.

Column 4,
Line 8, change "$V_2$" to -- $v_2$ --.
Line 54, before "machines" delete -- machine --.
Lines 56 and 57, after "coding", change "machines" to -- machine --.

Column 5,
Lines 1 and 52, after "input", change "symbols" to -- symbol --.

Column 6,
Line 28, change "v2=qp" to -- v2=p --.
Line 36, before "pair", change "an" to -- a --.
Line 45, before "binary", change "an other" to -- another --.
Line 58, before "pair", change "an" to -- a --.
Line 59, before "ports", change "outputs" to -- output --.
Line 63, change "v2=qp" to -- v2=p --.

Column 7,
Line 3, after "each", insert -- of -- .
Line 10, before "pair", change "an" to -- a --.
Line 11, before "ports", change "outputs" to -- output --.

UNITED STATES PATENT AND TRADEMARK OFFICE
CERTIFICATE OF CORRECTION

PATENT NO. : 6,847,312 B2
DATED : January 25, 2005
INVENTOR(S) : Gadi Lenz et al.

It is certified that error appears in the above-identified patent and that said Letters Patent is hereby corrected as shown below:

Column 8,
Line 6, before "bitstream", change "is" to -- and is a -- .
Line 10, before "regular", change "is" to -- and is a --.
Lines 13, 17 and 21, after "machine" (first occurrence), delete -- machine --.
Lines 14 and 18, before "is", insert -- and --.

Signed and Sealed this

Seventh Day of June, 2005

JON W. DUDAS
*Director of the United States Patent and Trademark Office*